United States Patent [19]

Fellows

[11] Patent Number: 4,756,211
[45] Date of Patent: Jul. 12, 1988

[54] CONTINUOUSLY-VARIABLE RATIO TRANSMISSION FOR AN AUTOMOBILE VEHICLE

[76] Inventor: Thomas G. Fellows, 1 Greenbrook Ave., Hadley Wood, Barnet, Hertfordshire EN4 07S, England

[21] Appl. No.: 906,089

[22] Filed: Sep. 11, 1986

[30] Foreign Application Priority Data

Sep. 13, 1985 [GB] United Kingdom ............... 8522747

[51] Int. Cl.[4] ............................................. F16H 37/00
[52] U.S. Cl. ........................................ 74/740; 74/691
[58] Field of Search ............... 74/200, 691, 740, 792

[56] References Cited

U.S. PATENT DOCUMENTS

| | | | |
|---|---|---|---|
| 2,480,933 | 9/1949 | Jandasek | 74/792 |
| 3,548,682 | 12/1970 | Schofield et al. | 74/691 |
| 3,599,512 | 8/1971 | Wayman | 74/763 |
| 3,685,371 | 8/1972 | Crooks | 74/792 |
| 3,727,474 | 4/1973 | Fullerton | 74/740 X |
| 4,335,629 | 6/1982 | Falzoni | 74/689 |
| 4,355,547 | 10/1982 | Poole et al. | 74/200 X |
| 4,548,099 | 10/1985 | Wayman et al. | 74/689 |
| 4,638,687 | 1/1987 | De Brie Perry | 74/740 X |

FOREIGN PATENT DOCUMENTS

| | | |
|---|---|---|
| 0001348 | 4/1979 | European Pat. Off. |
| 0003408 | 8/1979 | European Pat. Off. |
| 43641 | 1/1982 | European Pat. Off. |
| 0043184 | 1/1982 | European Pat. Off. |
| 0069506 | 1/1983 | European Pat. Off. |
| 740692 | 11/1955 | United Kingdom |
| 1061560 | 3/1967 | United Kingdom |
| 1350763 | 4/1974 | United Kingdom |
| 1477747 | 6/1977 | United Kingdom |
| 1505817 | 3/1978 | United Kingdom |
| 2023753 | 1/1980 | United Kingdom ............... 74/200 |
| 2045368 | 10/1980 | United Kingdom |
| 2047823 | 12/1980 | United Kingdom |
| 2064683 | 6/1981 | United Kingdom |
| 2077374 | 12/1981 | United Kingdom |
| 2133095 | 7/1984 | United Kingdom |

OTHER PUBLICATIONS

Perbury Continuously Variable Ratio Transmission by T. G. Fellows et al., Pergamon Press, 1964—pp. 123–142.

Primary Examiner—Leslie A. Braun
Assistant Examiner—Dwight G. Diehl
Attorney, Agent, or Firm—Cushman, Darby & Cushman

[57] ABSTRACT

A transmission system, especially for use in automobile vehicles, in which the ratio-varying unit is of the continuously-variable type particularly the toroidal-race rolling traction type. An epicyclic combination is located between the ratio-varying unit output and the final output of the system as a whole. In reverse drive a band brake is engaged to arrest the epicyclic planet carrier so that the unit output and final output are connected by way of the epicyclic gearing, and an epicyclic ratio of substantially greater than 1:1 promotes proper speed limitation in reverse drive. In forward drive the brake is disengaged but a friction clutch is engaged to connect the unit output directly to the final output. By their progressive action the brake and clutch enable the transmission to start from rest in either forward or reverse drive, without the need for separate friction clutches.

4 Claims, 1 Drawing Sheet

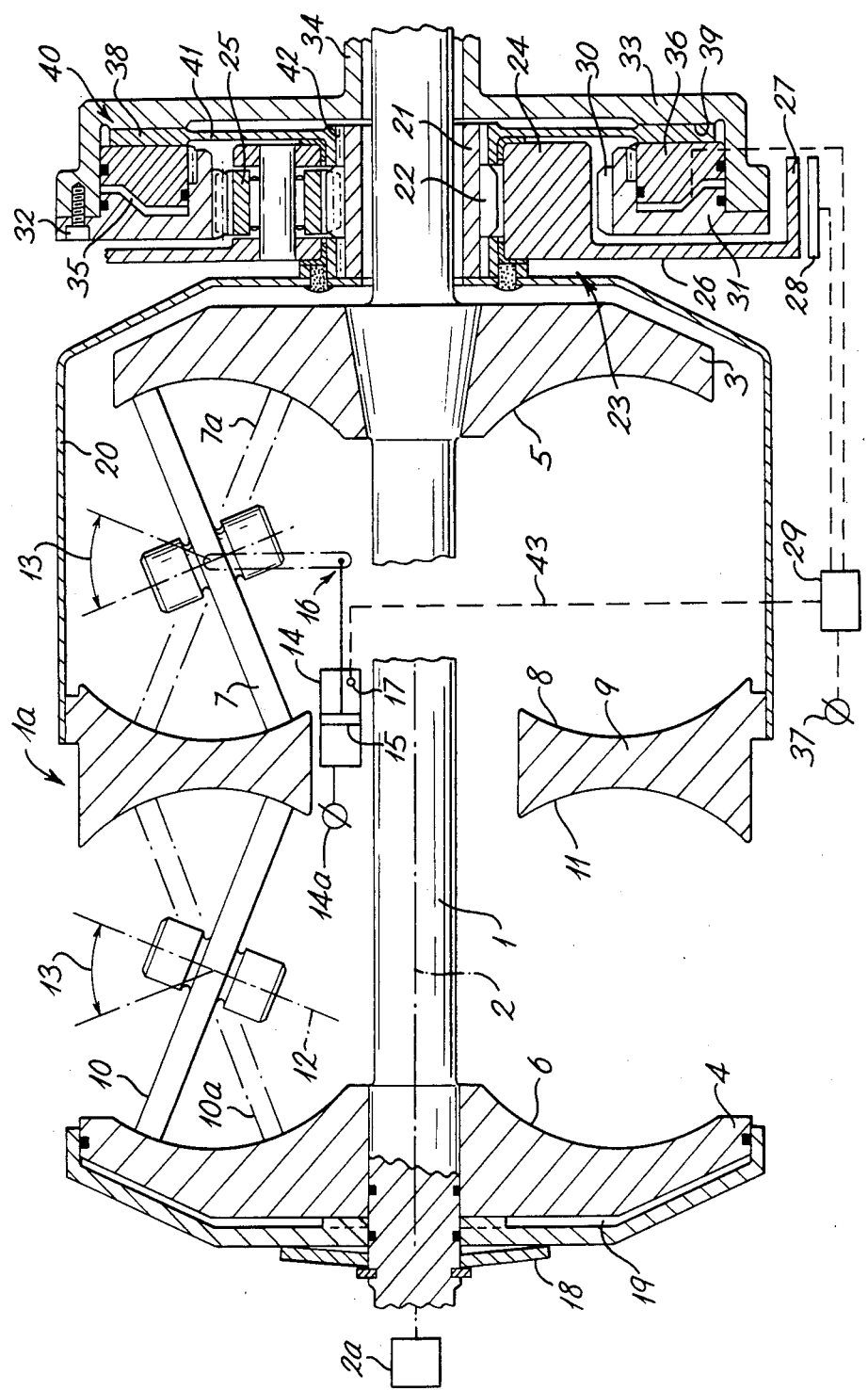

CONTINUOUSLY-VARIABLE RATIO TRANSMISSION FOR AN AUTOMOBILE VEHICLE

This invention relates to transmission systems, and especially to automatic transmissions for automotive vehicles. More particularly it relates to such systems in which the ratio-varying unit is of the continuously-variable kind. While the invention applies generally to systems with such ratio-varying units, which will be referred to as "ratio units", including the many belt-driven units of that kind now known, the invention applies in particular and will be described in relation to a continuously variable ratio transmission of the toroidal-race rolling traction type, for instance what is known as a Perbury transmission.

The ratio unit of every continuously variable ratio transmission contains at least one key movable element, movement of which—by an operator or automatically, for instance—results in a change of the transmitted ratio. In a Perbury transmission, the key elements are the rollers which roll in contact with, and transmit drive from, the input toroidal disc to the output toroidal disc. The essential shape and operation of these and other essential parts of any Perbury transmission are now described in many prior publications, for example UK specification Nos. 1078791 and 1209322, which correspond, respectively to U.S. Pat. Nos. 3,406,597 and 3,494,244.

Practical designs of Perbury transmission have been proposed in which the movement of the roller axes through the full range of their travel, necessary to take the transmitted ratio from maximum reverse to maximum forward speed, includes a clear discontinuity. For instance, in some designs the axis of a roller is tilted through a finite arc in order to change the transmitted ratio from maximum reverse through zero (i.e. neutral) to a low forward ratio, and then returned to the beginning of that same arc and moved through it a second time to change the output ratio from that low forward ratio on to maximum forward. Such designs present many problems—for instance the need to move each roller axis quickly through a considerable arc at the discontinuity—as well as the need for quite complex alternative gear sets and changeover mechanism downstream of the ratio unit to ensure that as the rollers return to start during the discontinuity adequate torque continues to be transmitted but without change of ratio.

Such problems are avoided in Perbury transmissions of the so called "synchronous change" type, for instance as illustrated in FIG. 1 of UK specification No. 1078791. In this type of transmission, movement of a roller axis through a finite arc again changes the transmitted ratio from maximum reverse through neutral to low forward. At that moment, without any further movement of the roller axes, the gear train downstream of the ratio unit is disconnected and a second train immediately connected in its place. The two gear trains are so designed that the transmitted torque and ratio are both unaltered by this change of gear trains, known in th art as a "synchronous change". If the roller axes are now moved back through the same arc in the reverse direction, the transmitted ratio rises from low to maximum forward. In this "synchronous change" type of Perbury transmission therefore there is only a reversal of rotation of the roller axes, not a discontinuity of the type previously described. However the necessary mechanism is still complex, requiring many gears and other parts to be accurately made and assembled. And both of the two types of transmission described so far share the characteristic, undesirable from some considerations, that in the "neutral" condition when the speed of the final output of the transmission is zero, that final output is not positively disconnected from the prime mover but still connected to it by many parts which are themselves in driven rotation, even though their resultant motion is zero.

The present invention aims to provide a continuously-variable transmission of Perbury or other type which, by use of a friction clutch, is capable of achieving the following advantages.

Firstly, it avoids the disadvantages of the discontinuity of movement inherent in the first type of design described above.

Secondly, it is less complex and expensive than the second, "synchronous change" type also just described.

Thirdly, it provides for a clear and positive disconnection between the prime mover and the final output at neutral.

More specifically, the invention offers the prospect of improvements in simplicity and performance over the kind of Perbury transmission described in the article "Perbury Continuously Variable Ratio Transmission" published by Pergamon Press in 1964 and reprinted from "Advances in Automobile Engineering (Part II)", being the Proceedings of a Symposium on Automatic Transmissions, held at the Advanced School of Automobile Engineering, Cranfield, Bedfordshire, United Kingdom in July 1963. FIG. 16 on page 138 of that article is a diagram of a hypothetical Perbury transmission including a ratio-varying unit, a friction clutch, an epicyclic combination and the final drive member of the transmission arranged in sequence. A toothed, positive-engagement device associated with the epicyclic combination can be set in two positions: in one of these it locks a component of the epicyclic and connects the ratio unit to the final drive through the epicyclic so that the final drive rotates in the reverse sense, and in the other it connects the ratio unit directly to the final drive so that forward motion is transmitted. Because of the positive engagement of this device, one essential function of the friction clutch is to provide the degree of slip that is necessary to start the transmission from rest in either forward or reverse drive, by reason of the facts that the minimum ratio of the Perbury unit is greater than zero and that the prime mover by which the transmission is driven will have a finite minimum running speed. Another feature of the hypothetical transmission shown in FIG. 16 of the quoted article is that the epicyclic combination is of differential-type layout and therefore has a ratio of unity. One consequence of this is that the maximum speeds of rotation of the final drive in forward and reverse, although opposite in sign, can be equal in magnitude. Without further safety features, a vehicle fitted with such a transmission would therefore be capable of a dangerously high road speed in reverse drive. The diagram shows no such features but they would undoubtedly be present in a practical version of such a transmission, probably in the form of means to hold the ratio unit at or near minimum ratio whenever reverse drive is in operation.

Another consequence of the unity ratio is that a driver of a vehicle fitted with the transmission will need to maintain some slip of the friction clutch over exactly the same low-speed range in reverse drive as in forward. In forward drive friction clutches typically engage fully—that is to say, cause to slip—when road speed reaches about 10 mph. This is acceptable, because in forward drive only a short time is usually taken to exceed 10 mph from rest. In reverse drive however a road speed exceeding 10 mph is seldom reached, let alone maintained, so with an epicyclic of unity ratio as shown in FIG. 16 of the quoted article the friction clutch will be slipping for almost the whole of the time during which reverse drive is engaged. This will generate harmful heat and wear within the clutch.

The invention is defined by the claims, the content of which forms part of the disclosure of this specification, and the invention will now be described by way of example, with reference to the accompanying drawing which is an axial section through a Perbury transmission with some parts shown only schematically.

BRIEF DESCRIPITON OF THE DRAWING

The single FIGURE is a secitonal view substantially in elevation of the transmission of the present invention.

An input shaft 1, rotatable about the transmission axis 2 by a prime mover 2a, drives input discs 3 and 4 of a ratio-varying unit (indicated generally by reference 1a) of the toroidal-race rolling traction type. Discs 3 and 4 are formed with toroidal races 5 and 6 respectively. A set of three rollers (of which one, 7, is shown) transmit drive from race 5 to a corresponding toroidal race 8 on one side of a single output disc 9, and a complementary set of three rollers (of which one, 10, is shown) transmit drive from race 6 to race 11 on the opposite side of output disc 9. The ratio control mechanism—that is to say the mechanism to tilt the axes of the rollers 7 and 10 through arcs 13 and thus alter the transmitted ratio—is of hydraulically-actuated type. Essentially it comprises a hydraulic source 14a connected to a hydraulic cylinder 14 the piston 15 of which is connected to the rollers by way of an otherwise mechanical linkage indicated at 16. The details of such a ratio control mechanism are described in UK specification No. 2023753A, for example. For the purpose of the present invention the most significant points are only that the mechanism is hydraulically-operated and that a sensor 17 continuously senses the hydraulic pressure within the system. The use to which this sensed pressure is put will be explained later. Other customary features of the transmission include a pre-load spring 18 and hydraulic cylinder 19 for urging discs 3, 4 and 9 axially together, so as to ensure efficient traction between the discs and the rollers.

A bell-shaped member 20 connects the periphery of output disc 9 to a sleeve 21 on which is mounted the sun gear 22 of an epicyclic combination indicated generally by reference 23. The planet carrier 24 of the combination, carrying three single planet gears 25, is mounted on a framework including a radial web 26 formed with a peripheral flange 27 which acts as reaction member to a band brake which is indicated diagrammatically at 28 and is operated by a hydraulic system including a pump 37 and a control member 29, both indicated diagrammatically.

The annulus gear 30 of epicyclic 23 is connected to a flange 31 attached by bolts 32 to a corresponding flange 33 integral with a sleeve 34 which constitutes the final output member of the transmission unit. Flanges 31 and 33 define between them an annular-section cylinder 35 containing a piston 36 of corresponding shape and connected to the same hydraulic system (source 37 and control member 29) as the brake 28. The face of piston 36, an opposed face 39 presented by flange 33, and an annular plate 38 located between them together constitute a clutch indicated generally by reference 40: plate 38 is attached to sleeve 21 by a radial web 41 and a spline 42.

For reverse motion, the driver operates control member 29 so that brake 28 progressively engages the reaction member 27 and holds planet carrier 24 stationary, but so that cylinder 35 is disconnected from pressure source 37 and clutch 40 is disengaged. Drive is therefore transmitted from output member 20 to output member 34 by way of all the elements of epicyclic combination 23, with a reversal of direction due to the motion of the planets 25. With brake 28 and the hydraulic system operating thus, and with the rollers 7, 10 in the positions in which they are shown in full lines for a given speed of rotation of input shaft 1 the final output 34 will be rotating at its maximum reverse speed. If now the roller axes are rotated through an arc 13 by the mechanism 14–16 to the position in which they are shown by the dotted lines 7a and 10a, the angular velocity of output member will fall until it is rotating at the minimum driven reverse speed of which it is capable for that speed of input shaft 1.

If then control 29 is operated to disengage the brake 28, the planet carrier 24 and its attached framework 26, 27 are free to rotate so that the elements of epicyclic 23 cease to transmit drive. The reverse speed of output member 34 will therefore tend to fall still further. If then the control 29 is operated to energise the pump 37 so as to pressurise the cylinder 35, so that clutch 40 is operative and plate 38 and face 39 are brought progressively into engagement, drive without a reversal of direction is established between members 20 and 34 by way of sun 22, web 41, plate 38 and flange 33. Output member 34 therefore then rotates at the lowest driven forward speed of which it is capable, and as mechanism 14–16 tilts rollers 7, 10 back towards their full-line positions forward speed increases, until it reaches a maximum when the rollers regain that full-line position.

Such a construction appears to have the following advantages. Firstly, an epicyclic 23 with an annulus/sun ratio of substantially above unity, say about 3:1 will be a natural choice in order to create an appropriate and relatively narrow speed range in reverse drive when the epicyclic is operative, compared with a wider range in forward drive when it is not and when a direct 1:1 ratio is transmitted between members 20 and 34.

Secondly, the heat and wear generated during engagement (i.e. during slip) of the brake 27, 28 are diminished because the maximum road speed at which full engagement of the brake is typically achieved in reverse drive is not the same as the corresponding speed in forward drive—which would be the case if the epicyclic ratio was unity—but smaller by a factor equal to the ratio. Thirdly because of the reduced heat input the use of a relatively simple, compact and inexpensive brake (like the illustrated band brake 27, 28, for instance) should be possible. Such a brake will tend to have low drag when disengaged, i.e. in forward drive.

It is, of course, important that the take-up and release of clutch 40 and brake 27, 28 should be as smooth as possible. To help achieve this, in an embodiment of the invention as illustrated in which the ratio unit is of the Perbury type, use may be made of the special characteristic of such a ratio unit by which the reaction torque between the rollers 7, 10 and the output disc 9, and thus the torque at clutch 40 or brake 27–28, is related to the hydraulic pressure in the roller ratio control circuit, that is to say the pressure sensed by sensor 17. Therefore during engagement of clutch 40 or brake 27–28, jerk may be detected as a rapid rate of change of the reading of sensor 17. By means of a modulating loop, which may be of negative feedback type and which is indicated schematically at 43, between sensor 17 and control member 29 and so (by way of the connections shown schematically by broken lines) with clutch 40 and brake 27–28, operation of clutch 40 and brake 27–28 by that control member may be modulated by some function of the ratio control pressure to promote smoother operation. That function could of course be the pressure itself, or some suitable derivative of it.

It will be appreciated that by appropriate operation of brake 27, 28 and clutch 40, both with their frictional and progessive action, an operator will be able to start the transmission from rest in either forward or reverse drive, without the need for a further transmission component in the form of a separate friction clutch.

I claim:

1. In an automobile vehicle, a transimssion system capable for operation in forward or reverse drive and comprising:
   a prime mover;
   a continuously-variable ratio-varying unit of the toroidal-race rolling traction type comprising at least one rotatable input disc formed with a first toroidal race, a coaxial and rotatable output disc formed with at least one second toroidal race, and rollers having adjustable orientation and establishing drive-transmitting connection between said first and second toroidal races;
   an epicyclic combination comprising a sun element, a planet carrier element, a plurality of planet members carried on said planet carrier element, and an annulus element, the ratio of said annulus element to said sun element being greater than unity;
   a final output member connected to said annulus element; said ratio-varying unit, epicyclic combination and final output member being arranged in sequence in the order hereinbefore stated;
   a source of fluid under pressure;
   a first progressively-acting engagement device, in communication with said source of fluid and operable to lock said planet carrier element whereby, in the reverse drive, said rotatable output disc and said final output member are connected with speed reduction by way of said planet elements;
   a connection between said rotatable output disc and said sun element;
   a second progressively-acting engagement device, in communication with said source of fluid and operable to connect said sun element to said final output member;
   means operable on the adoption of said forward drive to release said first engagement device and to supply fluid to operate said second engagement device to establish drive transmission between said sun element and said final output member, said transmission by-passing said planet carrier element thereby relieving said planet members of any substantial loading when said forward drive is in operation;
   and in which a hydraulic mechanism is provided to control the said orientation of said rollers of said ratio-varying unit and including sensing means to sense the hydraulic pressure within said mechanism, and in which moldulating loop means are associated with the operable means of at least one of said engagement devices with said sensing means, whereby the load on said at least one engagement device is modulated in accordance with a function of said hydraulic pressure.

2. In an automobile vehicle, a transmission system according to claim 1 including a first reaction member of circular configuration, fixed to and coaxial with said planet carrier element, and in which said fist engagement device includes a circular band brake also coaxial with said planet carrier element and engageable radially-inwardly with said first reaction member.

3. In an automobile vehicle, a transmission system according to claim 1, in which said second engagement device has an actuating member in the form of an annular piston coaxial with said sun element.

4. In an automobile vehicle, a transmission system according to claim 3 including a second reaction member, and in which said annular piston is mounted on said annulus element and operates, when said second engagement device is engaged, to bring said sun element into direct communication with said final output member by way of said second reaction member.

* * * * *